US011348431B2

(12) United States Patent
Ohara

(10) Patent No.: US 11,348,431 B2
(45) Date of Patent: May 31, 2022

(54) IN-VEHICLE MONITORING DEVICE, IN-VEHICLE MONITORING SYSTEM, AND NON-TRANSITORY COMPUTER-READABLE MEDIUM

(71) Applicant: Hideyuki Ohara, Kyoto-fu (JP)

(72) Inventor: Hideyuki Ohara, Kyoto-fu (JP)

(73) Assignee: NIDEC MOBILITY CORPORATION, Aichi (JP)

( * ) Notice: Subject to any disclaimer, the term of this patent is extended or adjusted under 35 U.S.C. 154(b) by 143 days.

(21) Appl. No.: 16/815,175

(22) Filed: Mar. 11, 2020

(65) Prior Publication Data
US 2020/0294379 A1 Sep. 17, 2020

(30) Foreign Application Priority Data

Mar. 11, 2019 (JP) .............................. JP2019-044063

(51) Int. Cl.
G06K 9/00 (2022.01)
G08B 21/02 (2006.01)
G08B 21/24 (2006.01)
G06V 20/59 (2022.01)
G06V 40/10 (2022.01)

(52) U.S. Cl.
CPC ........ *G08B 21/0294* (2013.01); *G06V 20/593* (2022.01); *G06V 40/103* (2022.01); *G08B 21/24* (2013.01)

(58) Field of Classification Search
CPC .... G08B 21/0294; G08B 21/24; G08B 21/22; G06K 9/00369; G06K 9/00838; G06K 9/036; G06K 9/00362
See application file for complete search history.

(56) References Cited

U.S. PATENT DOCUMENTS

| 2017/0104915 A1* | 4/2017 | Adachi | G06K 9/3233 |
| 2018/0165828 A1* | 6/2018 | Sasatani | G06K 9/00201 |
| 2020/0171977 A1* | 6/2020 | Jales Costa | B60N 2/002 |
| 2020/0249670 A1* | 8/2020 | Takemura | G05D 1/005 |

FOREIGN PATENT DOCUMENTS

| JP | 2003070050 A | | 3/2003 | |
| JP | 201252375 A | | 3/2012 | |
| JP | WO2017138146 | * | 8/2017 | ............ G08G 1/16 |
| JP | 2018191522 A | | 12/2018 | |

* cited by examiner

*Primary Examiner* — Dhaval V Patel
(74) *Attorney, Agent, or Firm* — Osha Bergman Watanabe & Burton LLP

(57) ABSTRACT

An in-vehicle monitoring device is configured to monitor an interior of a vehicle with reference to sensor information from a living body detection sensor. The in-vehicle monitoring device includes: a sensor information acquisition unit that acquires the sensor information from the living body detection sensor; a visual recognition information generation unit that generates visual recognition information indicating at least one of a detection range and a detection accuracy of the living body detection sensor with reference to the sensor information acquired by the sensor information acquisition unit; and a visual recognition information output unit that outputs the visual recognition information to a display device.

6 Claims, 9 Drawing Sheets

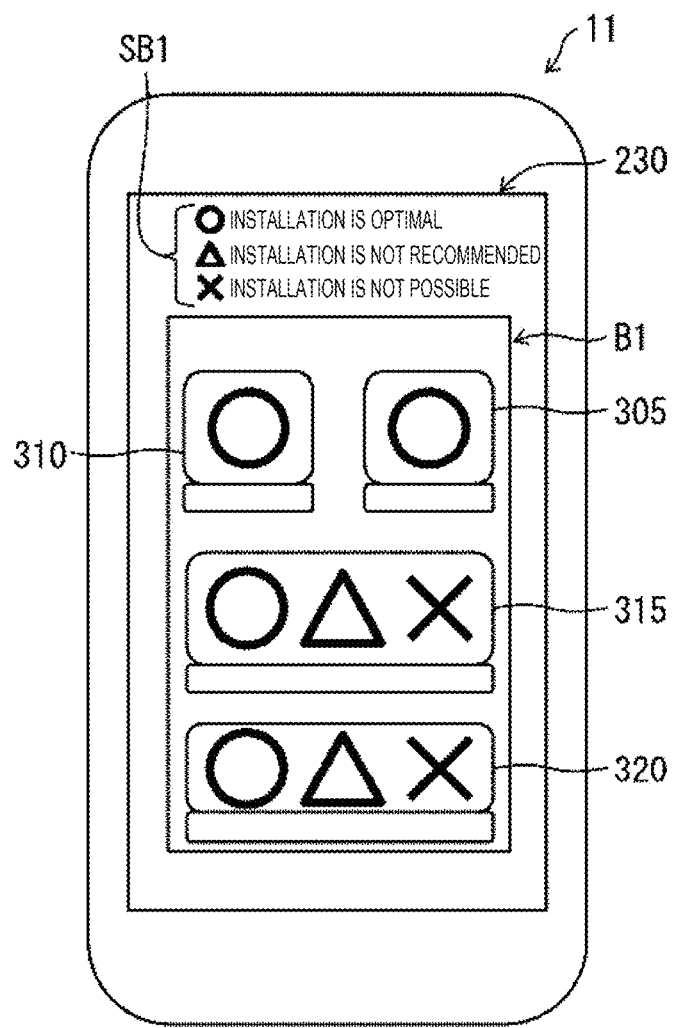

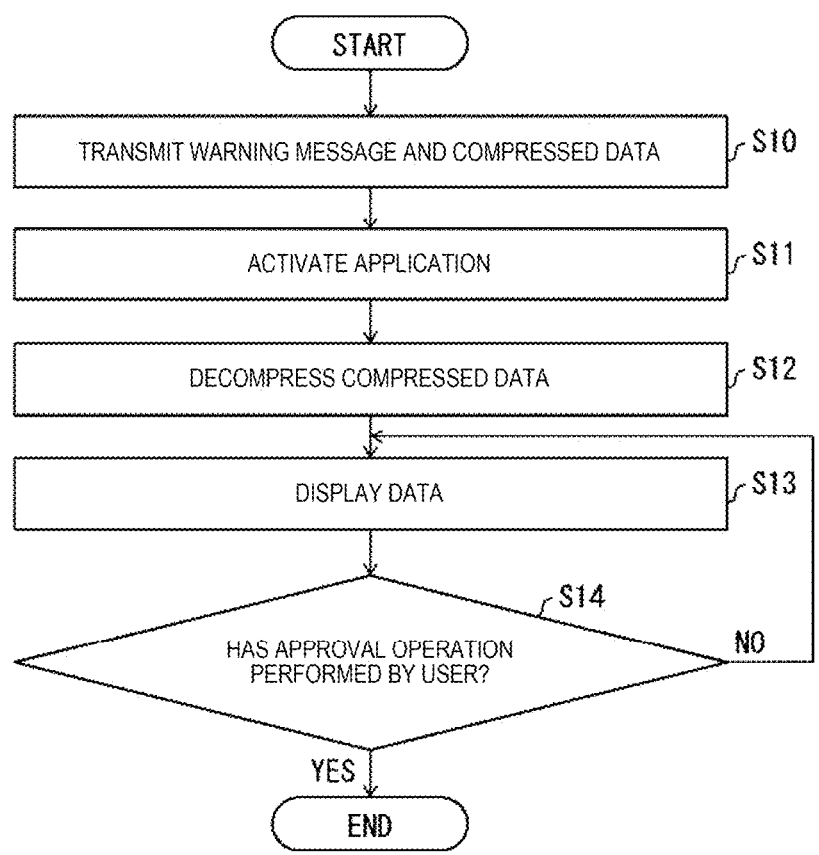

IN-VEHICLE MONITORING DEVICE, IN-VEHICLE MONITORING SYSTEM, AND NON-TRANSITORY COMPUTER-READABLE MEDIUM

CROSS-REFERENCES TO RELATED APPLICATIONS

This application is based upon and claims the benefit of priority from Japanese Patent Application No. 2019-044063, filed on Mar. 11, 2019; the entire contents of which are incorporated herein by reference.

FIELD

One or more embodiments of the present invention relate to an in-vehicle monitoring device, an in-vehicle monitoring system, and a non-transitory computer-readable medium storing an in-vehicle monitoring program.

BACKGROUND

The problem is that a guardian leaves an infant in a vehicle. Therefore, a leaving prevention system for detecting that an infant is left behind in a vehicle and providing an alarm has begun to be installed in the vehicle. In such a system, the presence or absence of a living body such as an infant in a vehicle is detected by using an action of a guardian leaving the vehicle as a trigger, and in a case where it is determined that the living body is present in the vehicle, an alarm to the outside of the vehicle is performed by horning or lighting a hazard lamp.

Meanwhile, in a field other than the leaving prevention system, JP-A-2018-191522 discloses a working vehicle for recording the intensity of radio waves received from a wireless terminal device in association with a vehicle position. JP-A-2012-52375 discloses an electronic key system including an electronic key for transmitting radio wave intensity information that corresponds to the intensity of a received radio wave. JP-A-2003-70050 discloses a technique for simply evaluating a communication range in a wireless communication system by computer simulation.

In the leaving prevention system, it is preferable to reliably inform a user that a failure has occurred in the system because the failure of the system causes the living body to be left behind in the vehicle. In particular, in a case where the failure occurs in a living body detection function, it is preferable to reliably inform the user of the failure.

An object of one or more embodiments of the present invention is to provide a technique capable of informing a user of a failure of a living body detection sensor related to monitoring of an interior of a vehicle.

SUMMARY

In one or more embodiments of the present invention, there is provided an in-vehicle monitoring device for monitoring an interior of a vehicle with reference to sensor information from a living body detection sensor, the device including: a sensor information acquisition unit that acquires the sensor information from the living body detection sensor; a visual recognition information generation unit that generates visual recognition information indicating at least one of a detection range and a detection accuracy of the living body detection sensor with reference to the sensor information acquired by the sensor information acquisition unit; and a visual recognition information output unit that outputs the visual recognition information to a display device.

According to the above-described configuration, the visual recognition information indicating at least one of the detection range and the detection accuracy of the living body detection sensor is output to the display device, whereby it is possible to visually inform the user of the visual recognition information. Accordingly, it is possible to reliably inform the user of the failure of the living body detection sensor related to the monitoring of an interior of the vehicle.

The visual recognition information may include a first image indicating a difference in detection accuracy of the living body detection sensor in the vehicle by a difference in color or shade. According to the above-described configuration, it is possible to inform the user of the degradation of the detection accuracy of the living body detection sensor in detail while making it easy to understand.

The visual recognition information may include a second image indicating an arrangement of seats in the vehicle. According to the above-described configuration, it is possible to inform the user of the detection accuracy of the living body detection sensor and the arrangement of the seats in association with each other. Therefore, the user can easily grasp in which seat the living body detection has a problem.

The visual recognition information may include the arrangement of seats in the vehicle and symbols indicating degrees of detection accuracy of the living body detection sensor at each position of the seat. According to the above-described configuration, it is possible to inform the user of the detection accuracy of the living body detection sensor and the arrangement of the seats in association with each other while making it easy to understand.

The in-vehicle monitoring device may further include: an abnormality detecting unit that detects an operational abnormality of the living body detection sensor, and the visual recognition information generation unit may generate the visual recognition information in a case where the abnormality detecting unit detects the operational abnormality of the living body detection sensor. According to the above-described configuration, since the visual recognition information generation unit generates visual recognition information in a case where an operational abnormality occurs in the living body detection sensor, the amount of processing by the visual recognition information generation unit can be reduced.

The in-vehicle monitoring device may further include: a getting-off intention determining unit that determines whether or not an occupant of the vehicle has an getting-off intention, and the visual recognition information output unit may output the visual recognition information to the display device in a case where the getting-off intention determining unit determines that the occupant has a getting-off intention. According to the above-described configuration, since the visual recognition information is output to the display device in a case where the occupant has a getting-off intention, it is possible to inform the user of the visual recognition information when the occupant gets off the vehicle and is likely to leave the living body such as an infant in the vehicle.

The in-vehicle monitoring device may further include: a getting-on intention determining unit that determines whether or not an occupant of the vehicle has an getting-on intention, and the visual recognition information output unit may output the visual recognition information to the display device in a case where the getting-on intention determining unit determines that the occupant has a getting-on intention.

According to the above-described configuration, since the visual recognition information is output to the display device in a case where the occupant of the vehicle has an getting-on intention, it is possible to inform the user of the visual recognition information when the occupant who can grasp the situation of the vehicle gets on the vehicle.

The sensor information may include an energization state, an output value, a reception sensitivity, and a reception level of each antenna included in the living body detection sensor, and operation log information of each part included in the living body detection sensor. According to the above-described configuration, the visual recognition information is generated with reference to the detailed sensor information regarding the living body detection sensor. Therefore, it is possible to generate the visual recognition information with high accuracy, and it is possible to inform the user of the visual recognition information with high accuracy.

In one or more embodiments of the present invention, there is provided an in-vehicle monitoring system including: the in-vehicle monitoring device; and a display device that displays visual recognition information generated by the in-vehicle monitoring device.

In one or more embodiments of the present invention, there is provided a non-transitory computer-readable medium storing an in-vehicle monitoring program for causing a computer to function as an in-vehicle monitoring device, and the in-vehicle monitoring program, when executed by the computer, causing the computer to function as the sensor information acquisition unit, the visual recognition information generation unit, and the visual recognition information output unit.

According to one or more embodiments of the present invention, it is possible to provide a technique capable of informing a user of a failure of a living body detection sensor related to monitoring of an interior of a vehicle.

BRIEF DESCRIPTION OF DRAWINGS

FIG. 5B is a view illustrating another example of the visual recognition information displayed on the display unit of the first terminal device illustrated in FIG. 3 in a case where the operational abnormality occurs in the living body detection sensor.

FIG. 7 is a flowchart illustrating a flow of processing in the first terminal device included in the in-vehicle monitoring system illustrated in FIG. 1.

DETAILED DESCRIPTION

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

(Configuration of In-Vehicle Monitoring System M1)

Figure 1:
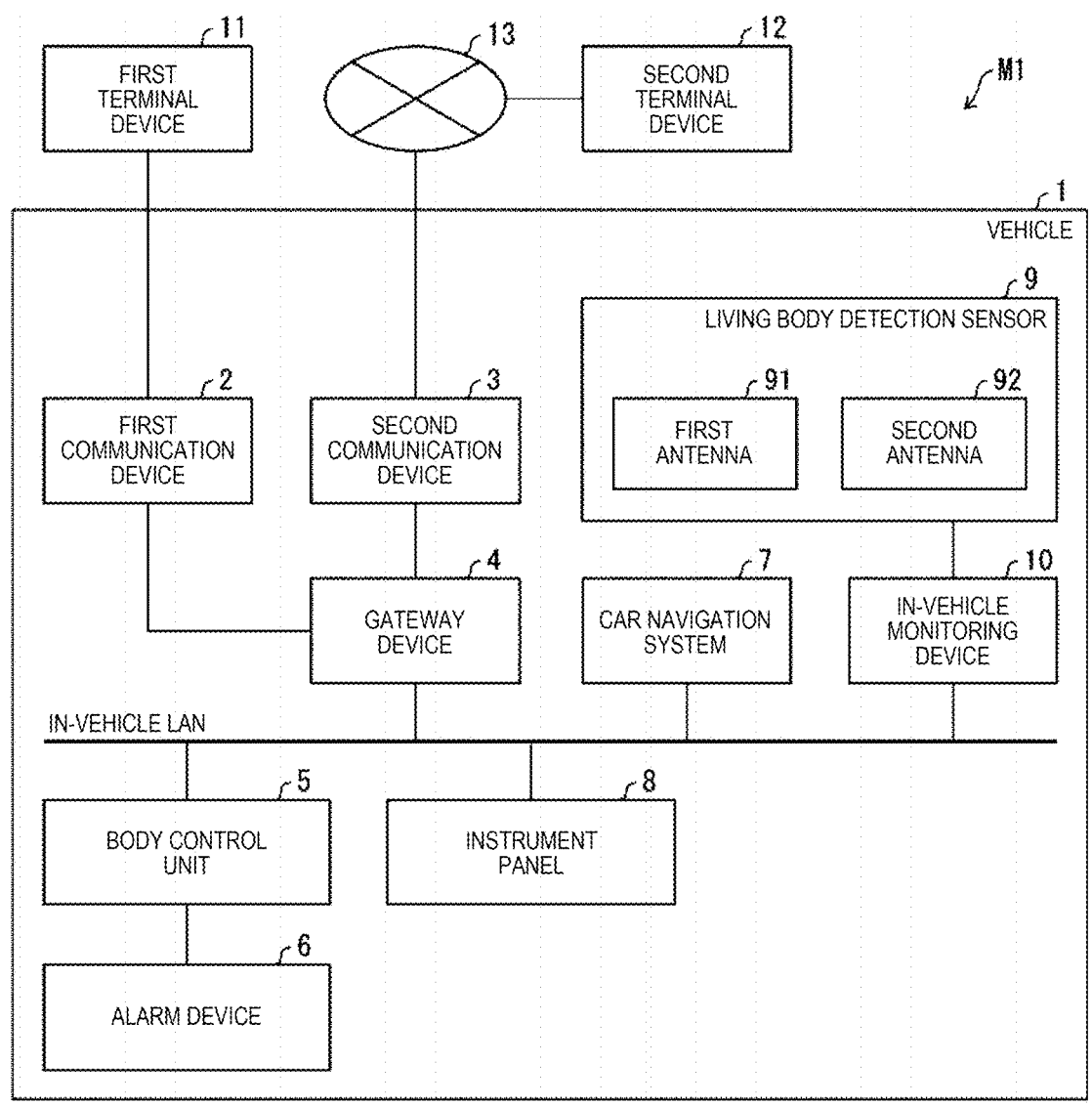
FIG. 1 is a block diagram illustrating a configuration of an in-vehicle monitoring system according to an embodiment of the invention.
Figure 2:
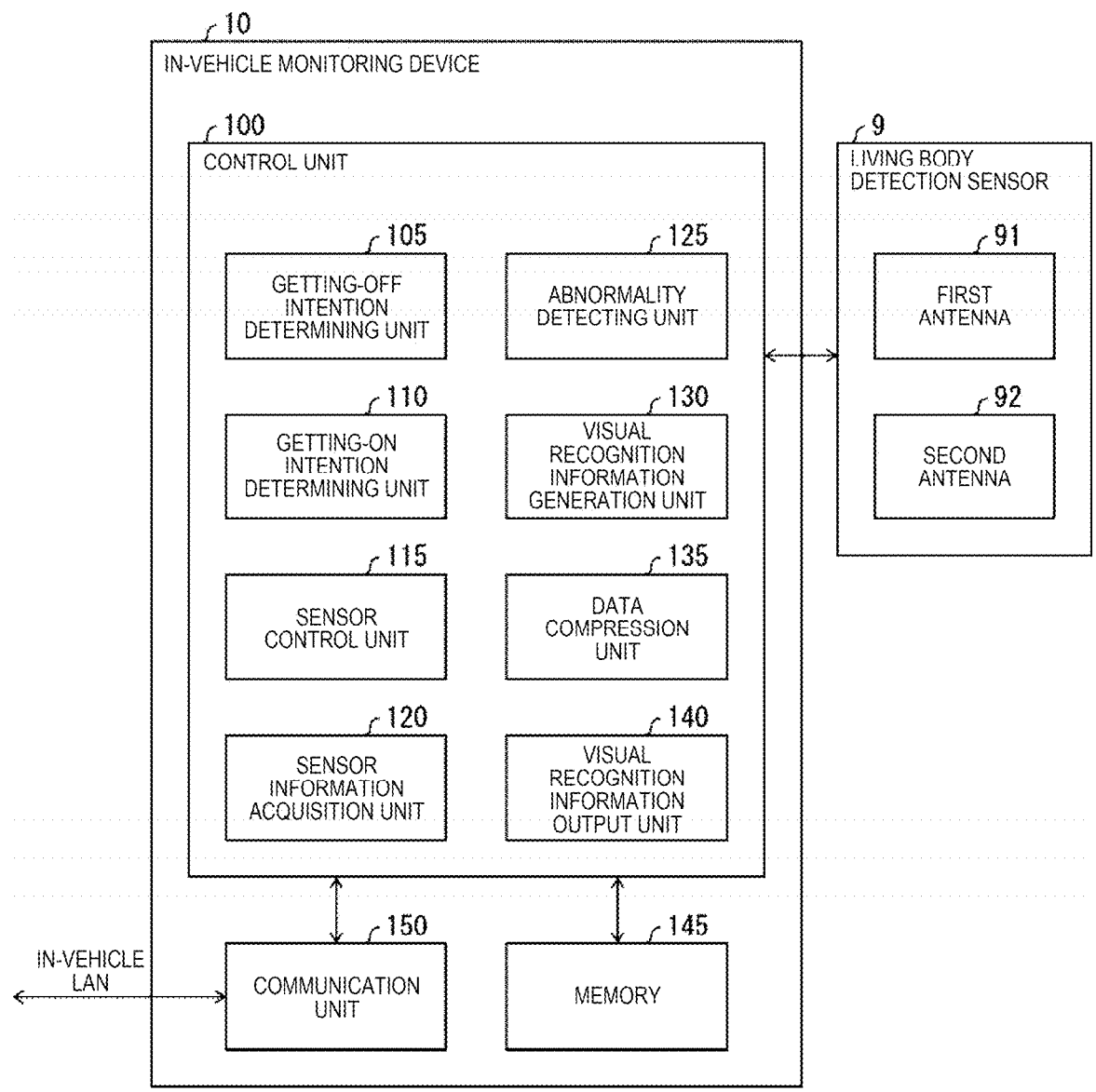
FIG. 2 is a block diagram illustrating a configuration of an in-vehicle monitoring device included in the in-vehicle monitoring system illustrated in FIG. 1.

A configuration of an in-vehicle monitoring system M1 will be described with reference to FIGS. 1 and 2. FIG. 1 is a block diagram illustrating a configuration of an in-vehicle monitoring system M1 according to an embodiment of the present invention. FIG. 2 is a block diagram illustrating a configuration of the in-vehicle monitoring device 10 included in the in-vehicle monitoring system M1 illustrated in FIG. 1. The in-vehicle monitoring system M1 includes a vehicle 1, a first terminal device 11, a second terminal device 12, and an Internet 13.

As illustrated in FIG. 1, the vehicle 1 includes a first communication device 2, a second communication device 3, a gateway device 4, a body control unit 5, an alarm device 6, a car navigation system 7, an instrument panel 8, a living body detection sensor 9, and the in-vehicle monitoring device 10. The gateway device 4, the body control unit 5, the car navigation system 7, the instrument panel 8, and the in-vehicle monitoring device 10 are connected to each other and communicate with each other via an in-vehicle local area network (LAN) provided in the vehicle 1.

The first communication device 2 is for the vehicle 1 to communicate with the first terminal device 11. Specifically, the first communication device 2 transmits transmission data acquired from the gateway device 4 to the first terminal device 11, and transmits reception data acquired from the first terminal device 11 to the gateway device 4. The communication between the first communication device 2 and the first terminal device 11 is performed by, for example, Bluetooth (registered trademark) or WiFi (registered trademark), but may be performed by other wireless communication.

The second communication device 3 is for the vehicle 1 to communicate with the second terminal device 12. Specifically, the second communication device 3 transmits the transmission data acquired from the gateway device 4 to the second terminal device 12 via the Internet 13, and transmits the reception data acquired from the second terminal device 12 to the gateway device 4 via the Internet 13.

Although the first communication device 2 communicates with the first terminal device 11 and the second communication device 3 communicates with the second terminal device 12, the first communication device 2 and the second communication device 3 may communicate with at least one of the first terminal device 11 and the second terminal device 12, respectively. The vehicle 1 may communicate with three or more terminal devices.

The gateway device 4 manages communication between the first communication device 2 and the second communication device 3 and the in-vehicle LAN. The body control unit 5 controls electrical components such as lights or wipers provided in the vehicle 1. The alarm device 6 is a device for outputting an alarm to the outside of the vehicle by a hazard or a horn. Each of the car navigation system 7, the instrument panel 8, a display unit 230 of the first terminal device 11, and a display unit 230 of the second terminal device 12 is an example of a display device that displays visual recognition information (which will be described later).

The living body detection sensor 9 detects bio-information of a living body such as an infant in an interior of the vehicle 1. The living body detection sensor 9 is, for example, a radio wave type living body sensor. The living body detection sensor 9 is provided in the interior of the vehicle 1. The living body detection sensor 9 is connected to the in-vehicle monitoring device 10. The living body detection sensor 9 includes two antennas, that is, a first antenna 91 and a second antenna 92, but may include three or more antennas. Each of the first antenna 91 and the second antenna 92 is designed in advance so as to be able to perform living body detection in regions different from each other in the interior of the vehicle 1.

In addition to the first antenna 91 and the second antenna 92, the living body detection sensor 9 includes an irradiation unit (not illustrated) for irradiating an electromagnetic wave, and a receiving unit (not illustrated) for receiving a reflected wave of the electromagnetic wave emitted by the irradiation unit. The living body detection sensor 9 may be an optical living body sensor using electromagnetic waves in a visible light region.

(Configuration of In-Vehicle Monitoring Device 10)

As illustrated in FIG. 2, the in-vehicle monitoring device 10 includes a control unit 100, a memory 145, and a communication unit 150. The in-vehicle monitoring device 10 is a device for monitoring the interior of the vehicle 1 with reference to sensor information from the living body detection sensor 9. The control unit 100 is connected to the living body detection sensor 9, the memory 145, and the communication unit 150. The control unit 100 includes a getting-off intention determining unit 105, a getting-on intention determining unit 110, a sensor control unit 115, a sensor information acquisition unit 120, an abnormality detecting unit 125, a visual recognition information generation unit 130, a data compression unit 135, and a visual recognition information output unit 140.

The getting-off intention determining unit 105 determines whether or not an occupant of the vehicle 1 has an getting-off intention. Specifically, first, for example, in a case where a shift position of the vehicle 1 is parking (P), the body control unit 5 transmits information indicating that the shift position of the vehicle 1 is parking (P) to the communication unit 150 of the in-vehicle monitoring device 10 via the in-vehicle LAN.

Subsequently, when the control unit 100 receives the information from the communication unit 150, the getting-off intention determining unit 105 determines that the occupant of the vehicle 1 has a getting-off intention. In addition, even in a case where the occupant of the vehicle 1 unbuckles the seat belt and the door of the vehicle 1 is locked, the same processing as the processing in a case where the shift position of the vehicle 1 is parking (P) is performed, and the getting-off intention determining unit 105 determines that the occupant of the vehicle 1 has a getting-off intention.

The getting-on intention determining unit 110 determines whether or not the occupant of the vehicle 1 has a getting-on intention. Specifically, for example, in a case where an IG (ignition) power of the vehicle 1 is turned on, the body control unit 5 transmits information indicating that the IG power of the vehicle 1 is turned on to the communication unit 150 of the in-vehicle monitoring device 10 via the in-vehicle LAN. When the control unit 100 receives the information from the communication unit 150, the getting-on intention determining unit 110 determines that the occupant of the vehicle 1 has a getting-on intention.

The sensor control unit 115 controls the living body detection sensor 9. Specifically, the sensor control unit 115 controls both the first antenna 91 and the second antenna 92, and the irradiation unit and the receiving unit which are described above. The sensor information acquisition unit 120 acquires the sensor information from the living body detection sensor. The sensor information acquisition unit 120 stores the acquired sensor information in the memory 145.

In a case where the first antenna 91 is a transmitting antenna and the second antenna 92 is a receiving antenna, the living body detection sensor 9 can detect minute body movements of the living body by emitting electromagnetic waves by the first antenna 91 and receiving reflected waves by the second antenna 92.

Alternatively, in a case where both the first antenna 91 and the second antenna 92 are transmitting antennas, the living body detection sensor 9 generates a synthesized wave of two electromagnetic waves emitted from both the first antenna 91 and the second antenna 92, and changes the irradiation direction of the electromagnetic waves by shifting the phase. Accordingly, the living body detection sensor 9 covers the monitoring range. Here, the above-described irradiation unit is a driver for generating a waveform of an antenna, and the like, and the above-described receiving unit is a driver for generating a waveform for detection by a filter or the like after receiving the reflected wave.

The sensor information includes the energization state, the output value, the reception sensitivity, and the reception level of the first antenna 91 and the second antenna 92 included in the living body detection sensor 9, and the operation log information of each part included in the living body detection sensor 9. According to the above-described configuration, the visual recognition information (which will be described later) is generated with reference to detailed sensor information regarding the living body detection sensor 9. Therefore, it is possible to generate the visual recognition information with high accuracy, and it is possible to inform the user of the visual recognition information with high accuracy.

The abnormality detecting unit 125 detects an operational abnormality of the in-vehicle monitoring system M1 and an operational abnormality of the living body detection sensor 9. More specifically, the abnormality detecting unit 125 detects an operational abnormality of the in-vehicle monitoring system M1 with reference to the signals from each unit in the vehicle 1 acquired by the communication unit 150. In addition, the abnormality detecting unit 125 detects an operational abnormality of the living body detection sensor 9 based on sensor information from the living body detection sensor 9.

The visual recognition information generation unit 130 generates visual recognition information (visualization information, mapping data) indicating at least one of the detection range and the detection accuracy of the living body detection sensor 9 with reference to the sensor information acquired by the sensor information acquisition unit 120. The visual recognition information generation unit 130 provides the generated visual recognition information to the data compression unit 135. The data compression unit 135 compresses the data of the visual recognition information generated by the visual recognition information generation unit 130, and stores the compressed data in the memory 145.

Here, for example, a case where the sensor information is in the energization state of the first antenna 91 and the second antenna 92 is considered. In this case, the visual recognition information generation unit 130 generates visual recognition information indicating at least one of the detection range and the detection accuracy of the living body detection sensor 9 according to the energization state of the first antenna 91 and the second antenna 92. For example, in a case where one of the first antenna 91 and the second antenna 92 is not energized, the visual recognition information generation unit 130 generates visual recognition information indicating the detection range or the detection accuracy only by the other antenna.

Similarly, a case where the sensor information is the output value, the reception sensitivity, or the reception level of the first antenna 91 and the second antenna 92, is considered. In this case, the visual recognition information generation unit 130 generates visual recognition information indicating at least one of the detection range and the detection accuracy of the living body detection sensor 9 according to the output value, the reception sensitivity, and the degree of reception level of the first antenna 91 and the second antenna 92.

Further, in a case where the sensor information is operation log information of each part included in the living body detection sensor 9, the visual recognition information generation unit 130 generates the visual recognition information indicating at least one of the detection range and the detection accuracy of the living body detection sensor 9 according to the operation log information.

It is preferable that the visual recognition information generation unit 130 generates an image as the visual recognition information indicating at least one of the detection range and the detection accuracy of the living body detection sensor 9, but this does not limit the embodiment. The visual recognition information generation unit 130 may generate visual recognition information expressing the detection range and the detection accuracy as text data, or may generate visual recognition information combining an image and text data.

For example, a case where the reception sensitivity of the first antenna 91 and the second antenna 92 and the operation log information of each part included in the living body detection sensor 9 are acquired as sensor information, is considered. In this case, the visual recognition information generation unit 130 may generate an image indicating the detection range or the detection accuracy according to the reception sensitivity, and may generate visual recognition information by superimposing information indicating an operation log on the image.

In addition, the visual recognition information generation unit 130 may be configured to simulate the detection range of the living body detection sensor 9 according to the sensor information in advance, and store the detection range, which is the simulation result, in the memory 145. In a case of such a configuration, the visual recognition information generation unit 130 can generate the visual recognition information by reading out the detection range that corresponds to the sensor information from the memory 145 with reference to the sensor information acquired by the sensor information acquisition unit 120.

The simulation of the detection range of the living body detection sensor 9 may be executed in advance by a separate information processing apparatus (not illustrated), and the detection range of the living body detection sensor 9, which is the simulation result, may be stored in the memory 145.

The visual recognition information output unit 140 outputs the compressed data of the visual recognition information stored in the memory 145 by the data compression unit 135 to at least one of the car navigation system 7, the instrument panel 8, the display unit 230 of the first terminal device 11, and the display unit 230 of the second terminal device 12. A specific description will be given below. A case where the visual recognition information output unit 140 outputs visual recognition information to the car navigation system 7 or the instrument panel 8, is considered.

In this case, the visual recognition information output unit 140 transmits the compressed data of the visual recognition information stored in the memory 145 by the data compression unit 135 to the communication unit 150. The communication unit 150 transmits the compressed data of the visual recognition information to the car navigation system 7 or the instrument panel 8 via the in-vehicle LAN. The car navigation system 7 or the instrument panel 8 displays the data obtained by decompressing the compressed data of the visual recognition information by a data decompression unit (not illustrated) provided in the vehicle 1 as the visual recognition information on a display or the like.

Further, a case where the visual recognition information output unit 140 outputs visual recognition information to the display units 230 of the first terminal device 11 and the second terminal device 12, is considered. In this case, the visual recognition information output unit 140 transmits the compressed data of the visual recognition information stored in the memory 145 by the data compression unit 135 to the communication unit 150. The communication unit 150 transmits the compressed data of the visual recognition information to the gateway device 4 via the in-vehicle LAN.

The gateway device 4 transmits the compressed data of the visual recognition information to the first terminal device 11 via the first communication device 2, or transmits the compressed data of the visual recognition information to the second terminal device 12 via the second communication device 3 and the Internet 13. The processing of the visual recognition information by the first terminal device 11 and the second terminal device 12 will be described later. The timing at which the visual recognition information generation unit 130 generates the visual recognition information and the timing at which the visual recognition information output unit 140 outputs the visual recognition information are not limited to the embodiment, and the visual recognition information may be output at the timing described below.

For example, the visual recognition information generation unit 130 may generate visual recognition information in a case where the abnormality detecting unit 125 detects an operational abnormality of the living body detection sensor 9. Accordingly, since the visual recognition information generation unit 130 generates visual recognition information in a case where an operational abnormality occurs in the living body detection sensor 9, the amount of processing by the visual recognition information generation unit 130 can be reduced. In this case, the visual recognition information generation unit 130 may generate visual recognition information including at least one of text data and an image related to the content of the operational abnormality of the living body detection sensor 9 detected by the abnormality detecting unit 125.

In addition, the visual recognition information output unit 140 may output visual recognition information to at least one of the car navigation system 7, the instrument panel 8, the display unit 230 of the first terminal device 11, and the display unit 230 of the second terminal device 12 in a case where the getting-off intention determining unit 105 determines that the occupant has a getting-off intention. Accordingly, since the visual recognition information is output in a case where the occupant of the vehicle 1 has a getting-off intention, when the occupant gets off the vehicle and is likely to leave the living body such as an infant in the vehicle 1, it is possible to inform the user of the visual recognition information. In this case, the visual recognition information generation unit 130 may include the content for prompting the user to pay attention to a state where the living body is left behind in the visual recognition information. Accordingly, it is possible to reduce the possibility that the living body is left behind.

Further, the visual recognition information output unit 140 may output visual recognition information to at least one of the car navigation system 7, the instrument panel 8, the display unit 230 of the first terminal device 11, and the display unit 230 of the second terminal device 12 in a case where the getting-on intention determining unit 110 determines that the occupant has a getting-on intention. Accordingly, since the visual recognition information is output in a case where the occupant of the vehicle 1 has a getting-on intention, it is possible to inform the user of the visual recognition information when the occupant who can grasp the situation of the vehicle 1 gets on the vehicle. In this case, the visual recognition information generation unit 130 may include, in the visual recognition information, at least one of the text data and the image indicating the content for prompting the user not to dispose the living body outside the detection range of the living body detection sensor 9. Accordingly, it is possible to reduce the possibility that the living body is not detected by the living body detection sensor 9.

(Configuration of First Terminal Device 11)

Figure 3:
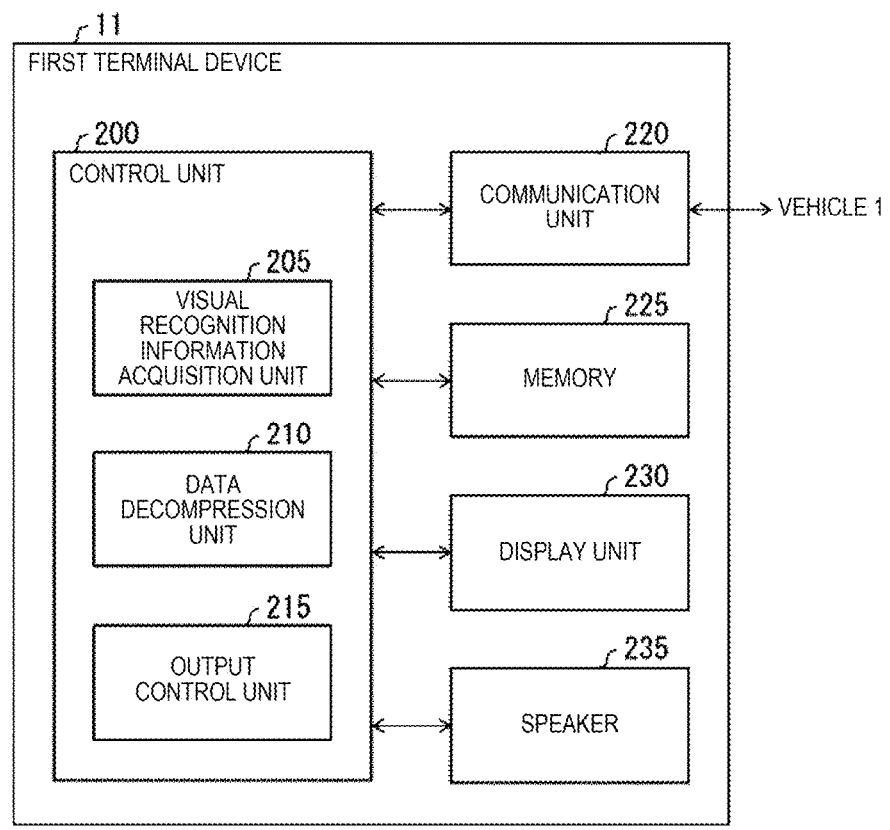
FIG. 3 is a block diagram illustrating a configuration of a first terminal device for communicating with a vehicle in the in-vehicle monitoring system illustrated in FIG. 1.

A configuration of the first terminal device 11 will be described with reference to FIG. 3. FIG. 3 is a block diagram illustrating a configuration of the first terminal device 11 that communicates with the vehicle 1 in the in-vehicle monitoring system M1 illustrated in FIG. 1. The first terminal device 11 is, for example, a portable information terminal such as a smart phone used by the user. As illustrated in FIG. 3, the first terminal device 11 includes a control unit 200, a communication unit 220, a memory 225, a display unit 230, and a speaker 235.

The control unit 200 is connected to the communication unit 220, the memory 225, the display unit 230, and the speaker 235. The control unit 200 includes a visual recognition information acquisition unit 205, a data decompression unit 210, and an output control unit 215. The visual recognition information acquisition unit 205 acquires the compressed data of the visual recognition information transmitted from the vehicle 1 via the communication unit 220.

The data decompression unit 210 decompresses the compressed data of the visual recognition information acquired by the visual recognition information acquisition unit 205. The data decompression unit 210 stores the decompressed data in the memory 225. The output control unit 215 performs control to output the data to the display unit 230 based on the data stored in the memory 225 by the data decompression unit 210.

The output control unit 215 may perform control to output the data to the speaker 235 based on the data stored in the memory 225 by the data decompression unit 210. Further, the output control unit 215 may perform control to output the data stored in the memory 225 by the data decompression unit 210 to at least one of the display unit 230 and the speaker 235.

The communication unit 220 communicates with the first communication device 2 of the vehicle 1 or the second communication device 3 of the vehicle 1. The display unit 230 displays the data output from the output control unit 215. The speaker 235 outputs the data output from the output control unit 215 as sound. The second terminal device 12 differs from the first terminal device 11 in that the communication unit 220 communicates with the vehicle 1 via the Internet 13.

(One Example of Display of Visual Recognition Information)

Figure 4A:
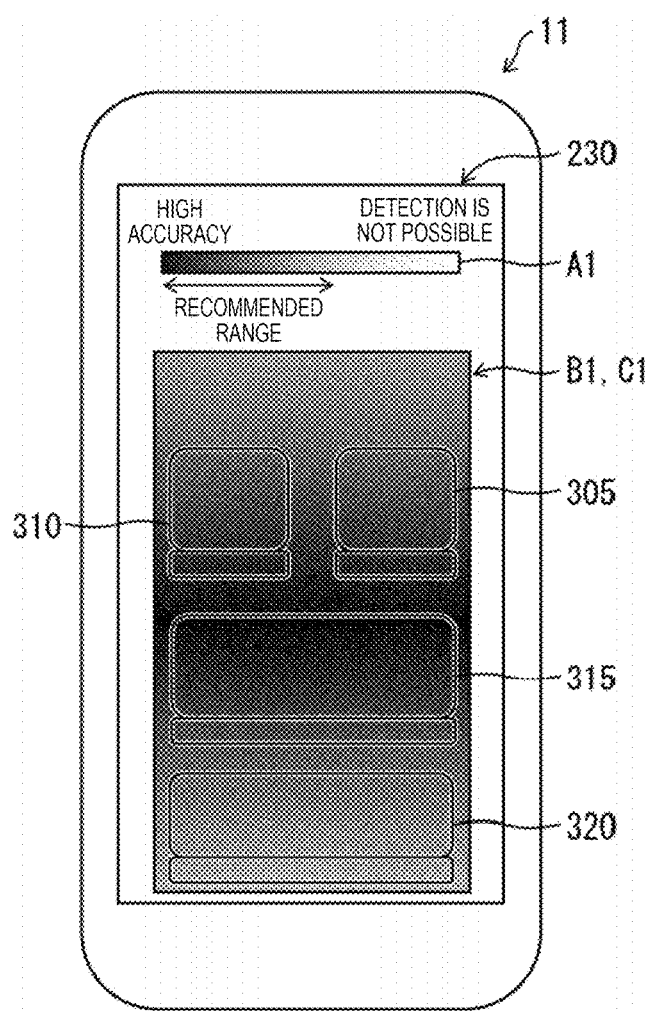
FIG. 4A is a view illustrating an example of visual recognition information displayed on a display unit of the first terminal device illustrated in FIG. 3 in a case where an operational abnormality does not occur in the living body detection sensor.
Figure 4B:
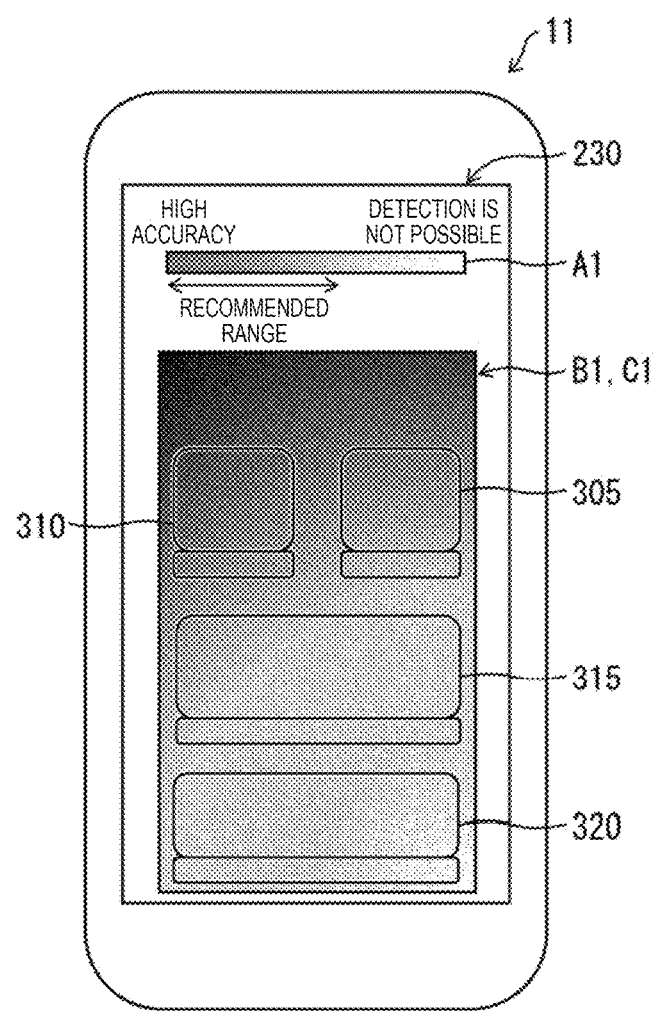
FIG. 4B is a view illustrating an example of the visual recognition information displayed on the display unit of the first terminal device illustrated in FIG. 3 in a case where the operational abnormality occurs in the living body detection sensor.

An example of the display of the visual recognition information will be described with reference to FIGS. 4 and 5. FIG. 4A is a view illustrating an example of the visual recognition information displayed on the display unit 230 of the first terminal device 11 illustrated in FIG. 3 in a case where the operational abnormality does not occur in the living body detection sensor 9. FIG. 4B is a view illustrating an example of the visual recognition information displayed on the display unit 230 of the first terminal device 11 illustrated in FIG. 3 in a case where an operational abnormality occurs in the living body detection sensor 9.

For example, a case where the visual recognition information generation unit 130 generates visual recognition information including an image A1, an image B1 (second image), and an image C1 (first image) as illustrated in FIGS. 4A and 4B, is considered. In this case, when the visual recognition information output unit 140 outputs the visual recognition information to the display unit 230 of the first terminal device 11, the display unit 230 displays the image A1, the image B1, and the image C1. The image A1 is an image illustrating the correspondence between the detection accuracy of the living body detection sensor 9 and the difference in color or shade, and the image B1 is an image illustrating the arrangement of the seats in the vehicle 1. The image C1 is an image illustrating a difference in detection accuracy of the living body detection sensor 9 in the vehicle 1 by a difference in color or shade.

In addition, the visual recognition information generation unit 130 generates the visual recognition information so as to include information indicating that the image C1 and the image B1 are displayed in a superimposed manner. The display unit 230 displays the image C1 and the image B1 in a superimposed manner by the visual recognition information output unit 140 outputting such information to the display unit 230. Further, as illustrated in FIGS. 4A and 4B, the visual recognition information generation unit 130 may generate the visual recognition information so as to include information indicating that a recommended range of detection accuracy of the living body detection sensor 9 is indicated in the vicinity of the image A1. Accordingly, the user can confirm the seat within the recommended range of the detection accuracy of the living body detection sensor 9. In this manner, the visual recognition information generation unit 130 visualizes the visual recognition information to the user.

In a case of FIG. 4A, the recommended range of the detection accuracy of the living body detection sensor 9 in the image C1 generated by the visual recognition information generation unit 130 overlaps with seats 305, 310, 315, and 320. Accordingly, the user can easily recognize that the seats 305, 310, 315, and 320 are within the recommended range of the detection accuracy of the living body detection sensor 9.

On the other hand, in a case of FIG. 4B, the recommended range of the detection accuracy of the living body detection sensor 9 in the image C1 generated by the visual recognition information generation unit 130 overlaps with the seats 305 and 310. Accordingly, the user can easily recognize that the seats 305 and 310 are within the recommended range of the detection accuracy of the living body detection sensor 9, and the seats 315 and 320 are outside the recommended range of the detection accuracy of the living body detection sensor 9.

In this manner, the visual recognition information output by the visual recognition information output unit 140 includes the image C1 indicating the difference in detection accuracy of the living body detection sensor 9 in the vehicle 1 by the difference in color or shade. Accordingly, it is possible to inform the user of the degradation of the detection accuracy of the living body detection sensor 9 in detail while making it easy to understand. The visual recognition information output by the visual recognition information output unit 140 includes the image B1 indicating the arrangement of the seats in the vehicle 1. Accordingly, it is possible to inform the user of the detection accuracy of the living body detection sensor 9 and the arrangement of the seats in association with each other. Therefore, the user can easily grasp in which seat the living body detection has a problem.

Figure 5A:
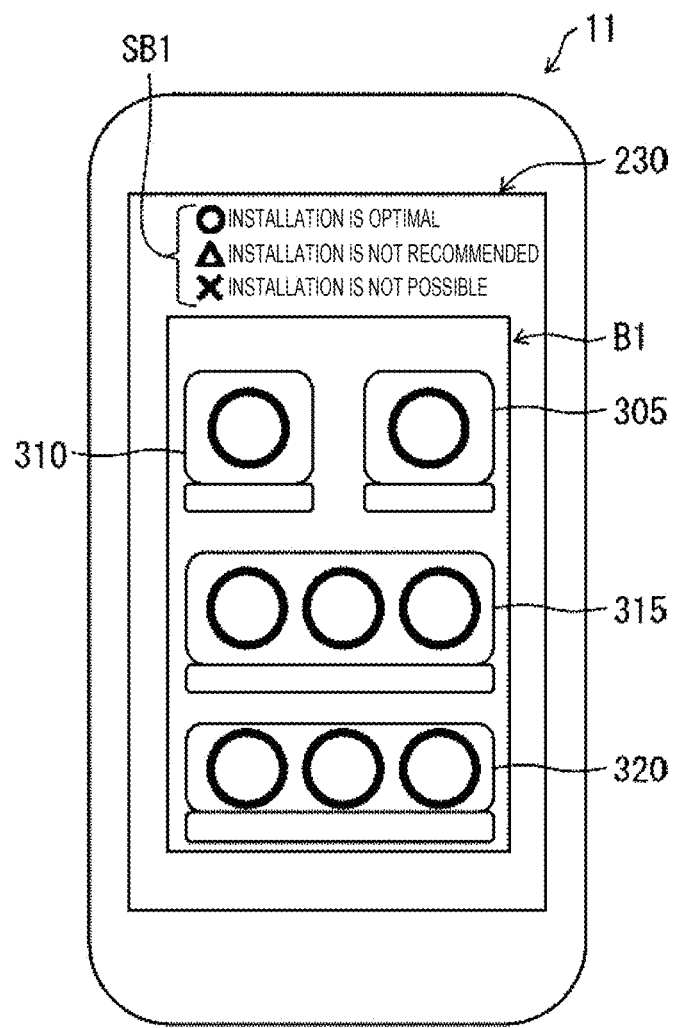
FIG. 5A is a view illustrating another example of the visual recognition information displayed on the display unit of the first terminal device illustrated in FIG. 3 in a case where the operational abnormality does not occur in the living body detection sensor.

FIG. 5A is a view illustrating another example of the visual recognition information displayed on the display unit 230 of the first terminal device 11 illustrated in FIG. 3 in a case where the operational abnormality does not occur in the living body detection sensor 9. FIG. 5B is a view illustrating another example of the visual recognition information displayed on the display unit 230 of the first terminal device 11 illustrated in FIG. 3 in a case where the operational abnormality occurs in the living body detection sensor 9.

For example, a case where the visual recognition information generation unit 130 generates the visual recognition information including images B1 and symbols SB1 as illustrated in FIGS. 5A and 5B. In this case, when the visual recognition information output unit 140 outputs the visual recognition information to the display unit 230 of the first terminal device 11, the images B1 and the symbols SB1 are displayed on the display unit 230. The symbols SB1 are symbols indicating the degrees of detection accuracy of the living body detection sensor 9 at each position of the seats.

In the symbols SB1 illustrated in FIGS. 5A and 5B, "O" indicates that the installation of the living body is optimal, that is, the detection accuracy of the living body detection sensor 9 is excellent. "Δ" indicates that the installation of the living body is not recommended, that is, the detection accuracy of the living body detection sensor 9 is not excellent. "X" indicates that the installation of the living body is not possible, that is, the living body cannot be detected by the living body detection sensor 9.

In a case of FIG. 5A, the range in which the detection accuracy of the living body detection sensor 9 is excellent overlaps with the seats 305, 310, 315, and 320. Accordingly, the user can easily recognize that the detection accuracy of the living body detection sensor 9 is excellent in the seats 305, 310, 315, and 320.

On the other hand, in a case of FIG. 5B, the range in which the detection accuracy of the living body detection sensor 9 is excellent overlaps with the positions on the left sides of the seats 305 and 310 and the seats 315 and 320. In addition, the range in which the detection accuracy of the living body detection sensor 9 is not excellent overlaps with the center position of the seats 315 and 320. Further, the range in which detection of the living body by the living body detection sensor 9 is not possible overlaps with the positions on the right sides of the seats 315 and 320.

Accordingly, the user can easily recognize that the detection accuracy of the living body detection sensor 9 is excellent at the position on the left side of the seats 305 and 310 and the seats 315 and 320. In addition, the user can easily recognize that the detection accuracy of the living body detection sensor 9 is not excellent at the center position of the seats 315 and 320, and can easily recognize that the living body cannot be detected by the living body detection sensor 9 at the position on the right side of the seats 315 and 320.

In this manner, the visual recognition information output by the visual recognition information output unit 140 includes the arrangement of the seats in the vehicle 1 and the symbols SB1 indicating the degrees of detection accuracy of the living body detection sensor 9 at each position of the vehicle 1. Accordingly, it is possible to inform the user of the detection accuracy of the living body detection sensor 9 and the arrangement of the seats in association with each other while making it easy to understand.

At least two of the images A1, B1, and C1 and the symbols SB1 may be appropriately selected, superimposed on each other, and displayed on the display unit 230. The contents illustrated in FIGS. 4 and 5 may be displayed on a display or the like of the car navigation system 7 or the instrument panel 8.

(Flow of Processing in Vehicle 1)

Figure 6:
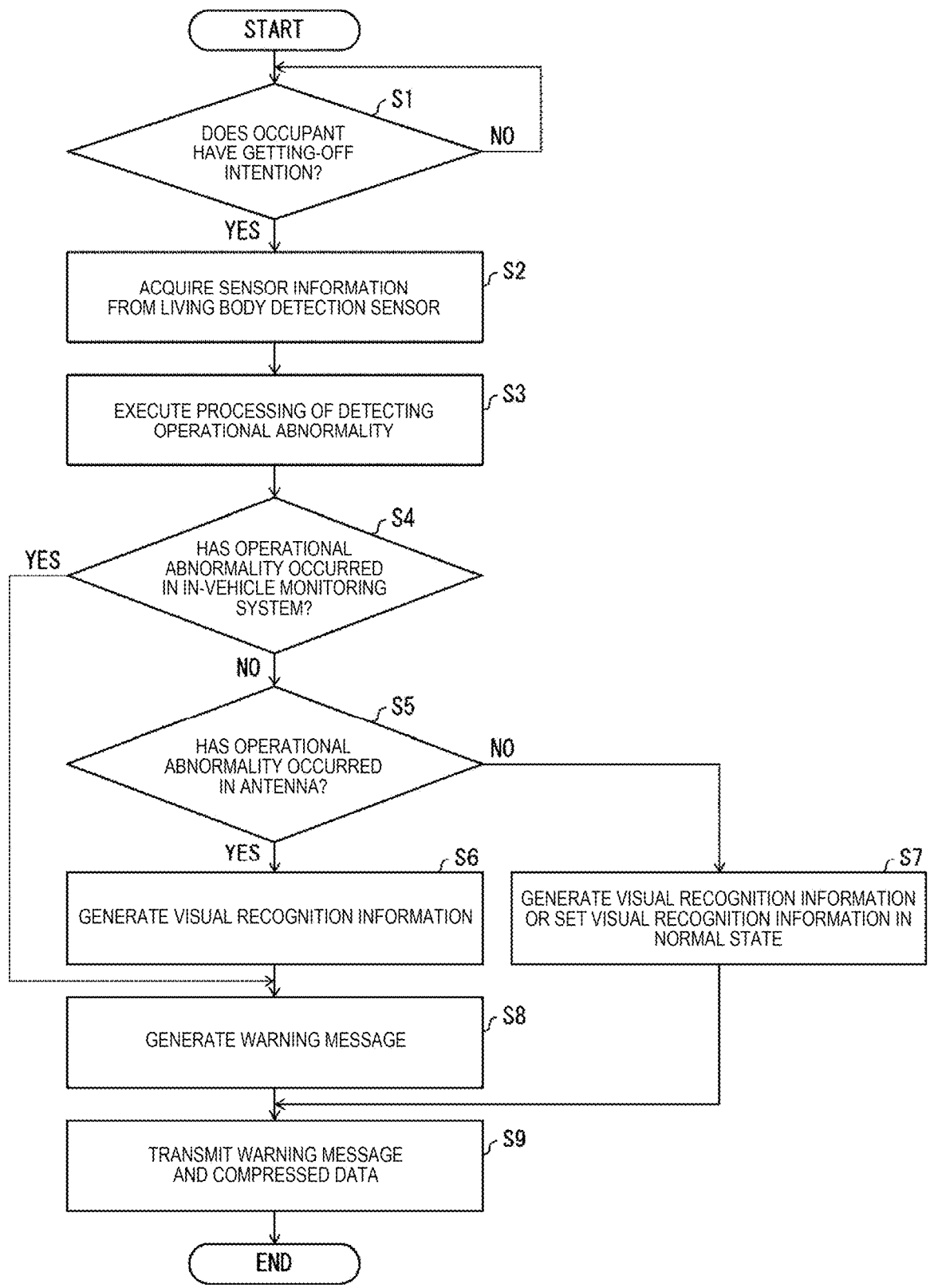
FIG. 6 is a flowchart illustrating a flow of processing in a vehicle included in the in-vehicle monitoring system illustrated in FIG. 1.

Next, a flow of processing in the vehicle 1 will be described with reference to FIG. 6. FIG. 6 is a flowchart illustrating a flow of processing in the vehicle 1 included in the in-vehicle monitoring system M1 illustrated in FIG. 1. As illustrated in FIG. 6, first, the getting-off intention determining unit 105 determines whether or not the occupant of the vehicle 1 has a getting-off intention (S1). In a case where the getting-off intention determining unit 105 determines that the occupant of the vehicle 1 has no getting-off intention (NO in S1), the process of S1 is continued.

In a case where the getting-off intention determining unit 105 determines that the occupant of the vehicle 1 has a getting-off intention (YES in S1), the sensor information acquisition unit 120 acquires the sensor information from the living body detection sensor 9 (S2). After the sensor information acquisition unit 120 acquires the sensor information, the abnormality detecting unit 125 executes a process of detecting the operational abnormality of the in-vehicle monitoring system M1 and the operational abnormality of the living body detection sensor 9 (S3).

In step S3, first, the abnormality detecting unit 125 determines whether or not the operational abnormality has occurred in the in-vehicle monitoring system M1 (S4). In a case where the abnormality detecting unit 125 determines that the operational abnormality has occurred in the in-vehicle monitoring system M1 (YES in S4), the process proceeds to S8. In a case where the abnormality detecting unit 125 determines that the operational abnormality has not occurred in the in-vehicle monitoring system M1 (NO in S4), the abnormality detecting unit 125 determines whether or not the operational abnormality has occurred in the first antenna 91 and the second antenna 92 of the living body detection sensor 9 (S5).

In a case where the abnormality detecting unit 125 determines that the operational abnormality has occurred in the first antenna 91 and the second antenna 92 (YES in S5), the visual recognition information generation unit 130 generates the visual recognition information with reference to the sensor information acquired by the sensor information acquisition unit 120 (S6). The visual recognition information generation unit 130 provides the generated visual recognition information to the data compression unit 135.

Then, the visual recognition information generation unit 130 generates a warning message for warning the user (S8). The visual recognition information generation unit 130 provides the generated warning message to the visual recognition information output unit 140. The warning message is output by the visual recognition information output unit 140, and the compressed data, which is the data obtained by compressing the data of the visual recognition information by the data compression unit 135, is output. Accordingly, the communication unit 150 transmits the warning message and the compressed data to the first terminal device 11 (S9).

On the other hand, in a case where the abnormality detecting unit 125 determines that the operational abnormality has not occurred in the first antenna 91 and the second antenna 92 (NO in S5), the visual recognition information generation unit 130 generates the visual recognition information or sets the visual recognition information in a normal state with reference to the sensor information acquired by the sensor information acquisition unit 120 (S7). The visual recognition information in the normal state is information generated in advance by the visual recognition information generation unit 130 in a state where the operational abnormality has not occurred in the first antenna 91 and the second antenna 92, and is stored in advance in the memory 145. Thereafter, the process proceeds to S9.

(Flow of Processing in First Terminal Device 11)

Next, the flow of processing in the first terminal device 11 will be described with reference to FIG. 7. FIG. 7 is a flowchart illustrating a flow of processing in the first terminal device 11 included in the in-vehicle monitoring system M1 illustrated in FIG. 1. After the processing of S9 described above, as illustrated in FIG. 7, first, the communication unit 220 of the first terminal device 11 receives the warning message and the compressed data from the vehicle 1 (S10).

The communication unit 220 transmits the received warning message and the compressed data to the control unit 200. When the control unit 200 receives the warning message and the compressed data from the communication unit 220, the control unit activates the application (S11). After the control unit 200 activates the application, the visual recognition information acquisition unit 205 acquires the warning message and the compressed data.

The visual recognition information acquisition unit 205 provides the acquired compressed data to the data decompression unit 210. The data decompression unit 210 decompresses the compressed data (S12). The data decompression unit 210 stores the decompressed data in the memory 225. The output control unit 215 performs control to output the data to the display unit 230 based on the data stored in the memory 225 by the data decompression unit 210.

The display unit 230 displays the data output from the output control unit 215 (S13). After the display unit 230 displays the data, the control unit 200 determines whether or not an approval operation has been performed by the user (S14). In a case where the control unit 200 determines that the approval operation has been performed by the user (YES in S14), the processing of the first terminal device 11 ends. On the other hand, in a case where the control unit 200 determines that the user has not performed the approval operation (NO in S14), the process returns to S13.

As described above, in the in-vehicle monitoring device 10, the visual recognition information indicating at least one of the detection range and the detection accuracy of the living body detection sensor 9 is output to the display device, whereby it is possible to visually inform the user of the visual recognition information. Accordingly, it is possible to reliably inform the user of the failure of the living body detection sensor 9 related to the monitoring the inside of the vehicle 1.

Further, a case where the performance of the in-vehicle monitoring system M1 deteriorates due to the defect of the living body detection sensor 9, and a part of the functions of the in-vehicle monitoring system M1 does not operate, is considered. In this case, when the detection range of the living body detection sensor 9 changes, for example, the user is informed of the detection range. Accordingly, even in a case where the performance of the in-vehicle monitoring system M1 degenerates, the in-vehicle monitoring system M1 can be operated even by temporarily restricting the usage, and the operation rate of the in-vehicle monitoring system M1 can be improved by informing the user of the content of the restrictions while making it easy to understand.

(Additional Notes)

The visual recognition information generated by the visual recognition information generation unit 130 and output by the visual recognition information output unit 140 may include sound data in addition to display data such as images illustrated in FIGS. 4 and 5. In a case of such a configuration, the sound data is supplied to at least one of the car navigation system 7, the first terminal device 11, and the second terminal device 12, and the sound indicated by the sound data is output from the corresponding speaker.

The sound data may be data indicating a warning sound, data including a content for prompting the contact to a dealer selling the vehicle 1, or data for notifying the user that the installation of the living body is not possible in a specific seat of the vehicle 1.

The display device for displaying the image indicated by the visual recognition information and the device for outputting the sound indicated by the sound data may be the same device or different devices. In the latter case, for example, an image indicated by the visual recognition information may be displayed in the car navigation system 7, and the sound may be output from the first terminal device 11. With such a configuration, it is possible to effectively notify the user of the detection range and the detection accuracy of the living body detection sensor 9.

(Implementation Example of Software)

The control block (in particular, the getting-off intention determining unit 105, the getting-on intention determining unit 110, the sensor control unit 115, the sensor information acquisition unit 120, the abnormality detecting unit 125, the visual recognition information generation unit 130, the data compression unit 135, and the visual recognition information output unit 140) of the in-vehicle monitoring device 10, and the control block (the visual recognition information acquisition unit 205, the data decompression unit 210, and the output control unit 215) of the first terminal device 11 and the second terminal device 12 may be realized by a logic circuit (hardware) formed on an integrated circuit (IC chip) or the like, or may be realized by software.

In the latter case, the in-vehicle monitoring device 10 includes a computer that executes commands of a program which is software for realizing each function. The computer includes, for example, one or more processors and a computer-readable recording medium in which the program is stored. In the computer, the object of one or more embodiments of the invention is achieved by reading and executing the program from the recording medium by the processor.

The processor may be, for example, a central processing unit (CPU). As the recording medium, tapes, disks, cards, semiconductor memories, programmable logic circuits, and the like can be used in addition to a "non-transitory tangible medium", for example, a read only memory (ROM) and the like. In addition, a random access memory (RAM) or the like for expanding the programs may further be provided. The program may be supplied to the computer via any transmission medium (communication network or a broadcast wave) capable of transmitting the program. In addition, one or more embodiments of the invention can also be realized in the form of a data signal embedded in a carrier wave in which the program is embodied by electronic transmission.

The invention is not limited to the above-described embodiments, and various modifications can be made within the scope illustrated in the claims, and embodiments obtained by appropriately combining technical means disclosed in different embodiments are also included in the technical scope of the invention.

The invention claimed is:

1. An in-vehicle monitoring device for monitoring an interior of a vehicle with reference to sensor information from a living body detection sensor, the in-vehicle monitoring device comprising:
    a sensor information acquisition unit that acquires the sensor information from the living body detection sensor;
    a visual recognition information generation unit that generates visual recognition information indicating at least one of a detection range and a detection accuracy of the living body detection sensor with reference to the sensor information acquired by the sensor information acquisition unit and a visual recognition information output unit that outputs the visual recognition information to a display device; and
    an abnormality detecting unit that detects an operational abnormality of the living body detection sensor,
    wherein the visual recognition information generation unit generates the visual recognition information in a case where the abnormality detecting unit detects the operational abnormality of the living body detection sensor.

2. An in-vehicle monitoring device for monitoring an interior of a vehicle with reference to sensor information from a living body detection sensor, the in-vehicle monitoring device comprising:
    a sensor information acquisition unit that acquires the sensor information from the living body detection sensor;
    a visual recognition information generation unit that generates visual recognition information indicating at least one of a detection range and a detection accuracy of the living body detection sensor with reference to the sensor information acquired by the sensor information acquisition unit and a visual recognition information output unit that outputs the visual recognition information to a display device; and
    a getting-off intention determining unit that determines whether or not an occupant of the vehicle has an getting-off intention,
    wherein the visual recognition information output unit outputs the visual recognition information to the display device in a case where the getting-off intention determining unit determines that the occupant has a getting-off intention.

3. An in-vehicle monitoring device for monitoring an interior of a vehicle with reference to sensor information from a living body detection sensor, the in-vehicle monitoring device comprising:
    a sensor information acquisition unit that acquires the sensor information from the living body detection sensor;
    a visual recognition information generation unit that generates visual recognition information indicating at least one of a detection range and a detection accuracy of the living body detection sensor with reference to the sensor information acquired by the sensor information acquisition unit and a visual recognition information output unit that outputs the visual recognition information to a display device; and
    a getting-on intention determining unit that determines whether or not an occupant of the vehicle has an getting-on intention,
    wherein the visual recognition information output unit outputs the visual recognition information to the display device in a case where the getting-on intention determining unit determines that the occupant has a getting-on intention.

4. The in-vehicle monitoring device according to claim 1, wherein the sensor information comprises an energization state, an output value, a reception sensitivity, and a reception level of each antenna included in the living body detection sensor, and operation log information of each part included in the living body detection sensor.

5. The in-vehicle monitoring device according to claim 2, wherein the sensor information comprises an energization state, an output value, a reception sensitivity, and a reception level of each antenna included in the living body detection sensor, and operation log information of each part included in the living body detection sensor.

6. The in-vehicle monitoring device according to claim 3, wherein the sensor information comprises an energization state, an output value, a reception sensitivity, and a reception level of each antenna included in the living body detection sensor, and operation log information of each part included in the living body detection sensor.

* * * * *